March 4, 1924.                L. S. KALLAJIAN                1,485,617
                                COASTER BRAKE
                              Filed May 22, 1920
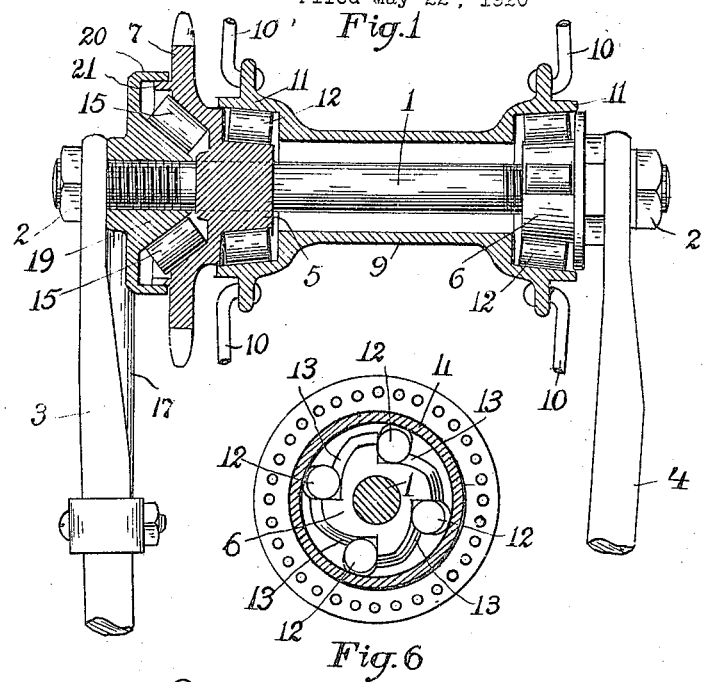
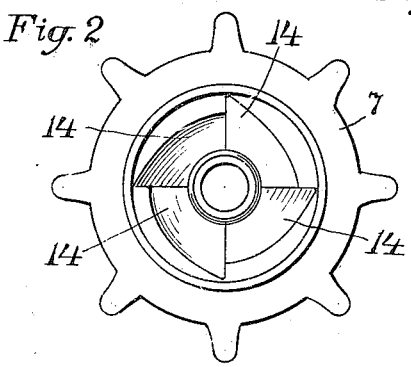
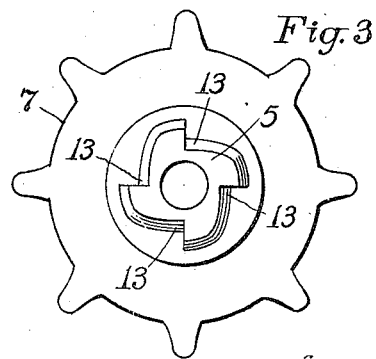
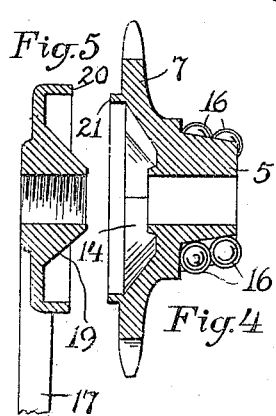
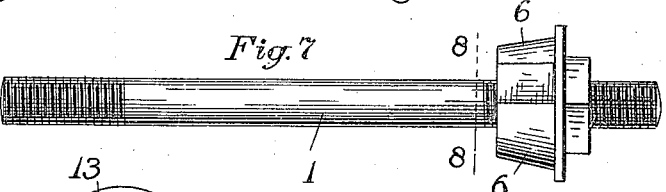
Inventor,
Lazarus S. Kallajian
By
A. B. Upham,
Attorney.

Patented Mar. 4, 1924.

1,485,617

UNITED STATES PATENT OFFICE.

LAZARUS S. KALLAJIAN, OF BOSTON, MASSACHUSETTS.

COASTER BRAKE.

Application filed May 22, 1920. Serial No. 383,351.

*To all whom it may concern:*

Be it known that I, LAZARUS S. KALLA-JIAN, a citizen of the United States, and a resident of Boston, in the county of Suffolk and Commonwealth of Massachusetts, have invented certain new and useful Improvements in Coaster Brakes, of which the following is a full, clear, and exact specification.

One of the pronounced difficulties found in connection with coaster brakes as at present constructed is their complication and multiplicity of parts, their liability to wear and their unreliability. The object of my invention is the construction of a coaster brake whose number of parts shall be reduced to a minimum, and shall be durable and always reliable; and whose cost shall be low, and the wear in which can be taken up in a moment.

To this end, I have produced a device for this purpose which, aside from nuts and rollers and balls, comprises but four or five parts, easily manufactured and assembled.

In the drawings forming part of this specification, Fig. 1 is a longitudinal section of a coaster brake embodying my improvements. Fig. 2 is a face view of the main clutch member. Fig. 3 is a face view of the latter from an opposite point. Fig. 4 is a central longitudinal section of the same. Fig. 5 is a sectional view of the cap and cone co-operating with the main clutch member. Fig. 6 is a cross section on the line 8—8 of Fig. 7. Fig. 7 is a side view of the spindle and a cone clutch member fixed thereon.

Referring to Fig. 1, the reference numeral 1 designates the spindle on whose ends are nuts 2 by which it is confined in eyes at the ends of the rear forks 3, 4 of a bicycle and rigidly held by the latter.

Upon the spindle 1 are cones 5 and 6, the cone 6 being fixed thereon but the cone 5 being movable thereon, both slidably and rotatably, the latter being made integral with or otherwise attached to a sprocket wheel 7 to which power is delivered from the pedals in a well known manner. About the spindle and cones is the barrel hub 9 from which the spokes 10 radiate in the customary manner, the ends of the hub being enlarged to form conical cups 11, and between each cone and its associated cup 11 are disposed several rollers 12, the cones being formed with cam grooves 13 to receive the rollers, as indicated in Figs. 3 and 6. These cam grooves are so disposed that the rotation of the cones in the forward direction of the drive wheel will not clamp the rollers 12. It is only when back-pedaling that these rollers are partially clamped between the cone 6 and cup 11, and then with only the degree of friction given by the strength of the backward push on the pedals.

When, however, the treadles are held stationary and without any back pressure the drive wheel continues to turn, the cam grooves release the rollers and so permit the bicycle to coast.

For applying the coaster brake, the outer face of the sprocket wheel 7 is concaved at an angle of forty-five degrees more or less, and formed with a plurality of arcuate cam grooves 14, as shown in Figs. 2 and 4, and in these grooves are located clutch rollers 15, as indicated in Fig. 1, or balls 16 as indicated in Fig. 4. Outside of the sprocket wheel 7 and attached to the fork 3 by an arm 17, is a cone 19 of approximately forty-five degrees, surrounded by a cup 20 which fits loosely about an annular flange 21 projecting from the sprocket wheel.

Between the cone 19 and the cam grooves 14 are located rollers 15, said cam grooves being opposite in actuation to the cam grooves 13 of the cones 5 and 6, so that when the sprocket wheel is turned backward by back-pedaling an instant, the rollers 15 are clutched between the cone 19 and the cams 14 and riding up on the cams, the rollers force apart the cone 19 and the sprocket wheel 7, the distance depending upon the degree of the back pressure applied to the pedals. This forcing apart draws the two cones 5 and 6 toward each other wedging the rollers 12 into frictional engagement between the interior conical surfaces of the cups 11 and the bottoms of their cam grooves 13. This frictional engagement being varied by the back pressure applied to the pedals, the braking action thus provided may be made at will either light or hard or any degree between.

Inasmuch as the cone 19 is rigidly connected with the fork 3 by means of the arm 17, this cone will not only not itself rotate, but it will also hold the spindle 1 from turning, since the latter is screwed into the cone. The cone 5, on the other hand, turns freely on the spindle, and when it is forcibly revolved through the agency of its sprocket wheel 7, and its rollers 12 are thereby gripped between its cam surfaces 13 and the interior periphery of the cup 11, the latter and with it the wheel will likewise be revolved. The driving is thus seen to be wholly done by the cam 5, and the cone 6 can be dispensed with if desired; but I prefer to employ it for its braking action additional to that of the cone 5. This action is clear when it is observed that while the cone 5 is held stationary by its sprocket 7, the cone 6 is always stationary, being held by its spindle 1, and the cam surfaces 13 of the cone 6 face the same way as do the cams of the cone 5. Apparently the cams face in opposite directions, as shown in Figs. 3 and 6, but this is because the two views are from opposite directions, looking in each case from the midlength of the spindle outward.

As is evident upon inspection, this coaster brake is composed of a small number of parts, is simple to manufacture, and durable in use. This durability is largely due to its ease in adjustment. In case the rollers or other parts wear sufficiently to fail of engagement when back pressure is applied, all that needs to be done is to tighten one or both of the nuts 2, when, the cones 5, 6 and cups 11 being tapering, the nearer location of these cones will take up all the wear.

In case further wear fails to be thus taken up, then the spindle 1 can be withdrawn, the other parts removed and new rollers 12 substituted.

It is not necessary to have the sprocket wheel splined upon or otherwise made to turn with the spindle, inasmuch as the cone 5 is ample for propelling the drive wheel, while the cone 6 aids in the braking, and its rollers serve as bearings during coasting. In addition to serving for a coaster brake, this device can be adapted for free wheel and clutch for motor cycles, automobiles, aeroplanes and power boats.

What I claim is:

1. The combination with a wheel having a tubular hub provided with a cup at one end, of a stationary spindle in said hub, a power-receiving member turning on said spindle and having a tapered projection reaching into said cup, one of the two last-named parts having longitudinally disposed cam grooves, rotative members in said grooves, a cup engaging the outer face of said power-receiving member, one of the two last-named parts having a longitudinally grooved cone and the other a cavity co-operating therewith, and rotative members in the grooves of said cone, whereby a rotation of said power-receiving member in one direction will forcibly rotate said hub and wheel, but a partial turn oppositely will frictionally resist such rotation.

2. The combination with a tubular member having two conical cups, of a spindle located within said tubular member, a cone located in one of said cups fast on said spindle, a cone located in the other cup loose on said spindle, both cones having cam grooves, rotatable members in said cam grooves, a driving member rotating with said loose cone for driving it and, through it and its rotatable members, the tubular member forward, and means whereby a backward movement given to said driving member will force said cones toward the smaller ends of their respective cups.

3. The combination with a tubular member having two conical cups disposed with their smaller ends between them, a stationary spindle supported within said tubular member, a cone within one of said cups and fixed on said spindle, a cone within the other cup loose on said spindle, both cones having cam grooves, rollers in said grooves, a driving member rigid with the loose cone, said parts being disposed to cause a forward movement of said driving member to rotate the tubular member with it, and means whereby a rearward movement given to the driving member draws said cones toward each other and causes said rollers to be tightly gripped between their cones and cups and the stationary cone to thereby apply a braking action to the tubular member.

4. The combination with a tubular member having a conical cup at each end disposed with their smaller ends inward, a stationary spindle located within said tubular member, a cone fixed on said spindle within one of said cups, a cone located in the other cup loose on said spindle, both cups having cam grooves, rotatable members turning in said grooves, a driving member rigid with the loose cone having a conically concave outer face, a stationary cone within said concave face, the latter having cam grooves, and rotatable members located in said cam grooves, the latter being arranged to enable a backward movement of said driving member to force the cones toward each other.

5. A bicycle wheel having a tubular barrel provided with conical cups at its ends, a stationary spindle extending through said barrel, a cone within one of said cups fixed on said spindle, a cone within the other cup loose on said spindle, both cones having cam grooves, a sprocket wheel formed integral with the loose cone, rollers in said grooves, the sprocket wheel having a conically concave outer face formed with cam grooves, a stationary cone within said concave outer face, and rollers in said last-named grooves, the latter cam grooves being disposed for acting oppositely to those of said loose cone.

6. A bicycle wheel having a tubular barrel having a conical cup at one end, a stationary spindle therein, a cone in said cup loose on said spindle, said cone having cam grooves, rotative members in said grooves, a sprocket wheel rigid with said grooved cone and having its outer face conically concave, a cone rigid with said spindle within said concave face, the latter having radially disposed cam grooves, rotative members in said grooves, and means for resisting relative longitudinal movement between said barrel and spindle, said grooves being disposed to enable the first-recited rotative members to deliver a forward motion to said barrel and wheel when the said sprocket wheel is turned forward, and to press said cones apart when the sprocket wheel is given a backward movement, the larger ends of said cup and its cone being adjacent the sprocket wheel.

In testimony that I claim the foregoing invention, I have hereunto set my hand this 20th day of May, 1920.

LAZARUS S. KALLAJIAN.